United States Patent [19]

Debesson

[11] Patent Number: 4,570,218
[45] Date of Patent: Feb. 11, 1986

[54] SYSTEM FOR THE DETECTION OF PROGRAMMABLE STOP CODES

[76] Inventor: Pierre Debesson, 8 rue Jean Jaurès, 92140 Clamart, France

[21] Appl. No.: 511,931

[22] Filed: Jul. 8, 1983

[30] Foreign Application Priority Data

Jul. 27, 1982 [FR] France ............................... 82 13084

[51] Int. Cl.⁴ ............................................. G06F 12/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,067,059 | 1/1978 | Derchak | 364/200 |
| 4,075,691 | 2/1978 | Davis et al. | 364/200 |
| 4,179,732 | 12/1979 | Khan et al. | 364/200 |
| 4,231,087 | 10/1980 | Hansburger et al. | 364/200 |

OTHER PUBLICATIONS

Patents Abstracts of Japan, vol. 6, No. 175, Sep. 9, 1982, p. 141 (1053); & JP-A-57 90 745 (Fujitsu K.K.) (05-0-6-82).
Proceedings of the Conference on Microprocessors in Automation and Communications, Sep. 19-22, 1978, University of Kent, IERE.
Conference Proceedings, No. 41, Londres (GB); G. Buren et al.: "A Microprocessor System Managing the IEC-Bus", pp. 395-402.
IEEE Transactions on Nuclear Science, vol. NS-20, No. 2, Apr. 1973, N.Y., F. A. Kirsten: "Some Characteristics of Interfaces Between Camac and Small Computers", pp. 42-49.
Wireless World, vol. 88, No. 1553, Feb. 1982, Olchester (GB); D. Zissos et al., "Hardware for Direct Memory Access Systems", pp. 60-62.
IBM Technical Disclosure Bulletin, vol. 9, No. 10, Mar. 1967, New York; R. J. Flaherty et al: "Memory Block Transfer", pp. 1333-1334.

Primary Examiner—Harvey E. Springborn
Attorney, Agent, or Firm—Oblon, Fisher, Spivak, McClelland & Maier

[57] ABSTRACT

A system for the detection of programmable stop codes in a data exchange performed between the local memory of a microprocessor and the peripheral unit in a microprocessor assembly using direct access circuit to the local memory. This circuit divides the access to a common bus permitting data exchanges between a peripheral unit and the local memory. The system comprises a random access memory receiving the data on addressing inputs and receiving an address bit on a data input, a control circuit having outputs which are respectively connected to validation and writing control inputs of the random access memory. The control circuit repectively receives on inputs, signals coming from the microprocessor or the direct access circuit and which respectively relate to the writing or reading input-output operations as well as to the address decoding of the data. The system also comprises a test circuit connected to a reading output of the random access memory for testing during the data exchange a binary value recorded at the current address of the random access memory and representing the presence of the absence of a stop code in the data.

3 Claims, 8 Drawing Figures

READING OPERATION IN A PERIPHERAL UNIT

WRITING OPERATION IN A PERIPHERAL UNIT

SIGNALS BETWEEN MICROPROCESSOR AND DIRECT ACCESS CIRCUIT DMA

PROGRAMMING OF A STOP CODE

Ao = 0 : STOP CODE
Ao = 1 : ABSENCE OF STOP CODE

DATA TRANSFER FROM A PERIPHERAL UNIT TO A LOCAL MEMORY THROUGH THE DIRECT ACCESS CIRCUIT DMA

DATA TRANSFER FROM A LOCAL MEMORY TO A PERIPHERAL UNIT THROUGH THE DIRECT ACCESS CIRCUIT DMA

SYSTEM FOR THE DETECTION OF PROGRAMMABLE STOP CODES

BACKGROUND OF THE INVENTION

The present invention relates to a system for the detection of programmable stop codes in a data transfer between the memory of a microprocessor and peripheral equipment in a processor assembly utilizing a direct access circuit to the memory.

This invention relates to the management of the data exchanges in a processor assembly incorporating a microprocessor, peripheral equipment and a direct access circuit to the microprocessor memory.

It is known that direct access circuits to the memory of a microprocessor are widely used in processor assemblies. They make it possible to more easily manage data exchanges between the memory of a microprocessor and its peripheral equipment. They also make it possible to increase the speed of the data exchanges. However, existing direct access circuits or DAC's only permit programming on a byte code and not a stop code. This leads to a significant time loss, which is prejudicial. The detection of a programmable stop code makes it possible to obviate this disadvantage.

It is also known that in data transmission it is always possible to forecast the number of characters to be transmitted. However, a problem occurs on reception of said data, where three different types of solution can be envisaged:

not to manage the reception with the aid of a DAC;
to supervise the reception by a timing system;
to introduce a stop code detection system, which is either unique, or non-programmable.

However, these different solutions have serious disadvantages.

In the case where reception is managed by a microprocessor and not a direct access circuit, the data exchange or transfer speeds are not very high, particularly if the microprocessor simultaneously has to manage several transfer lines.

When the reception is supervised by a timing system, the latter is dependent on the asynchronous line speed and must be modifiable. This solution can only be validly used, when the data transfer takes place in a "block" mode. In this case, the detection of the end of an exchange or transfer takes place much later than the true end of said exchange. For example, at a transmission speed of 300 bauds, the transfer of a character lasts 33 ms. Thus, the timing system is regulated so as to detect the fact that no character has been received for more than 40 ms. Thus, the time lag between detection and the effective end of an exchange is 40 ms.

The solution consisting of using a stop code detection system, which is either unique, or non-programmable is not very satisfactory. When it is necessary to detect a stop code, the simplest procedure is to detect a single character, fixed once and for all. However, a single stop character is not always adequate, and it is often necessary to have the possibility of modifying this character. In general, in known systems, the detection of a programmable stop code takes place by means of a register and a comparator. If it is then wished to have several different stop codes for the same data exchange (which is often the case), it is necessary to increase the number of registers and consequently the equipment making it possible to program these registers and detect the end of an exchange is made heavier, which is very onerous. In known systems, using a register and a comparator for each stop code, it is necessary, when it is wished to detect n simultaneous stop codes, to use n stop codes storage registers having n different inputs and consequently requiring n different address decodings. It is also necessary to use n comparators comparing the content of the registers with the data present on the bus. It is also possible to use only a single comparator for carrying out the comparison with the content of n registers, but in this case, it is necessary to present the content of n registers successively on one of the comparator inputs. Thus, in this case, n non-contiguous signals of a spectrum must be supplied for validating the output of n registers. These signals can be processed from one or more delay lines or a shift register, controlled at a given frequency. Although this solution reduces the number of comparators necessary, it considerably complicates the system control logics.

SUMMARY OF THE INVENTION

The present invention aims to obviate these disadvantages and in particular to provide a programmable stop code detection system, in a data transfer between the memories of a microprocess or and one of the peripheral equipments, in a processor assembly incorporating a direct access circuit to the memory. This circuit makes it possible to obviate any timing system at the reception of an exchange and also an unnecessary increase in the number of registers and comparators, when it is wished to detect several stop codes.

Thus, the invention specifically relates to a system for the detection of programmable stop codes in a data exchange performed between a local memory of each microprocessor of a microprocessor assembly and at least a peripheral unit, each microprocessor being connected to a direct access circuit to the local memory, said circuit also dividing the access to a common bus permitting data exchanges between the peripheral unit and the local memory, the system comprising a random access memory having addressing inputs receiving data and a data input receiving an address bit, a control circuit having outputs which are respectively connected to validation and writing control inputs of the random access memory, whereby said control circuit respectively receives on inputs signals coming from the microprocessor or the direct access circuit and which respectively relate to writing or reading input-output operations of the peripheral unit as well as to address decoding of the data, and a test circuit connected to a reading output of the random access memory for testing during a data exchange a binary value recorded at a current address of the random access memory and determined by the data, said test being controlled by a test control signal applied to the test circuit by the direct access circuit to the local memory of the microprocessor, the binary value being representative of the presence or the absence of a stop code in the data.

BRIEF DESCRIPTION OF THE DRAWINGS

The invention is described in greater detail hereinafter relative to non-limitative embodiments and the attached drawings, wherein.

The following drawings are chronograms permitting a better understanding of the operation of the system according to the invention.

Figure 3A:
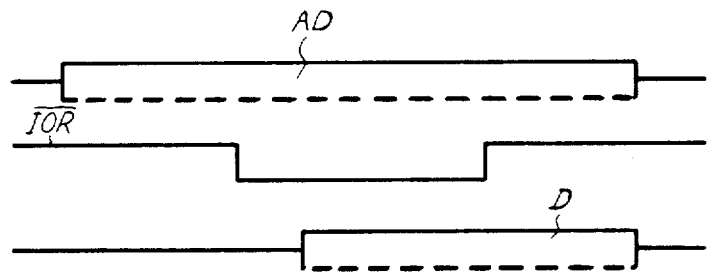
Figure 3B:
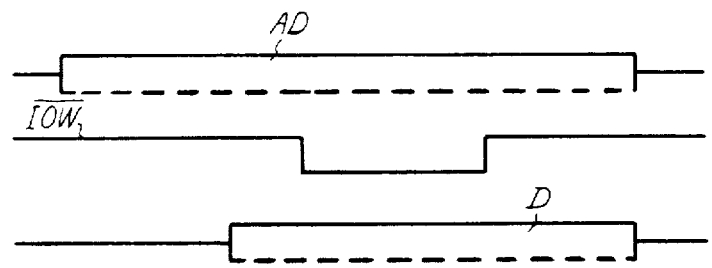

FIGS. 3A and 3B show chronograms respectively corresponding to the essential signals received or transmitted by a microprocessor of the assembly for carrying out reading or writing operations in a peripheral unit.

Figure 4:
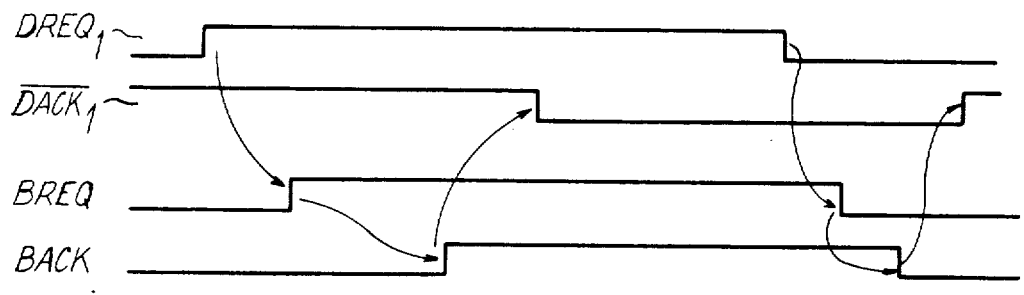

FIG. 4 shows a chronogram diagrammatically representing the main signals exchanged on the one hand between a microprocessor and the associated access request circuit, and on the other hand between said circuit and a peripheral equipment intervening on one of the channels of said access request circuit.

Figure 5:
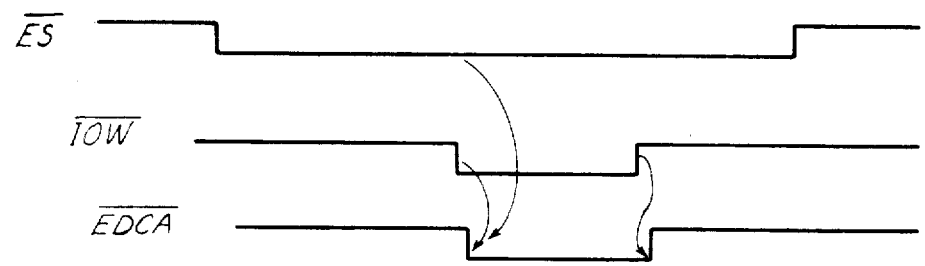
Figure 5:
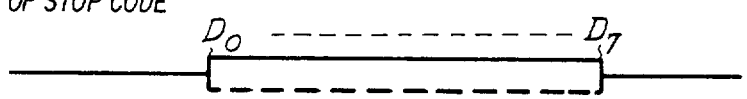

FIG. 5 shows a chronogram diagrammatically representing the main signals reaching the inputs of the system according to the invention for the programming of a stop code in the random access memory of said system.

Figure 6:
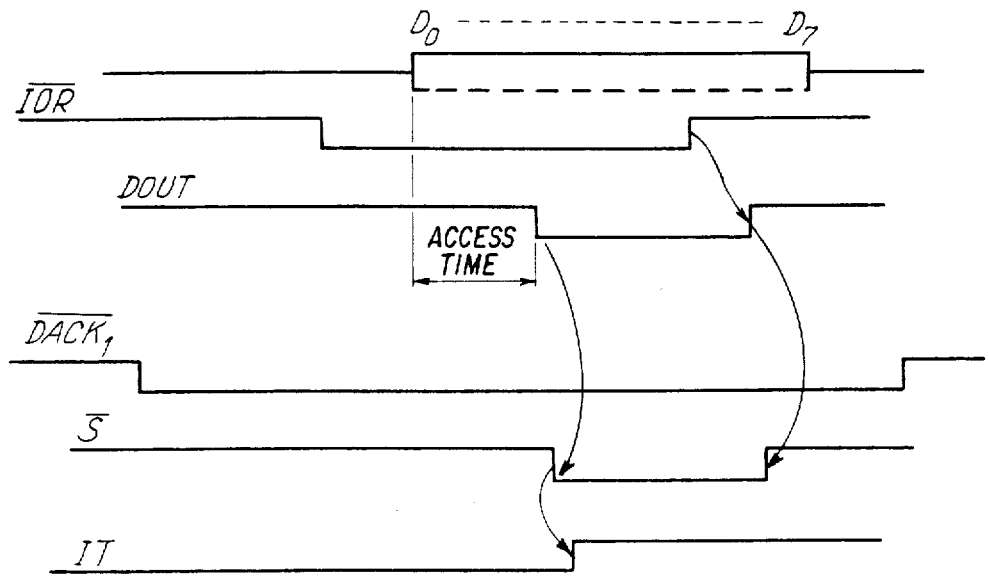

FIG. 6 shows a chronogram diagrammatically representing the main input and output signals of the system according to the invention in the case of the detection of a stop code during a data transfer from the peripheral resource to the local memory of a microprocessor of the assembly.

Figure 7:
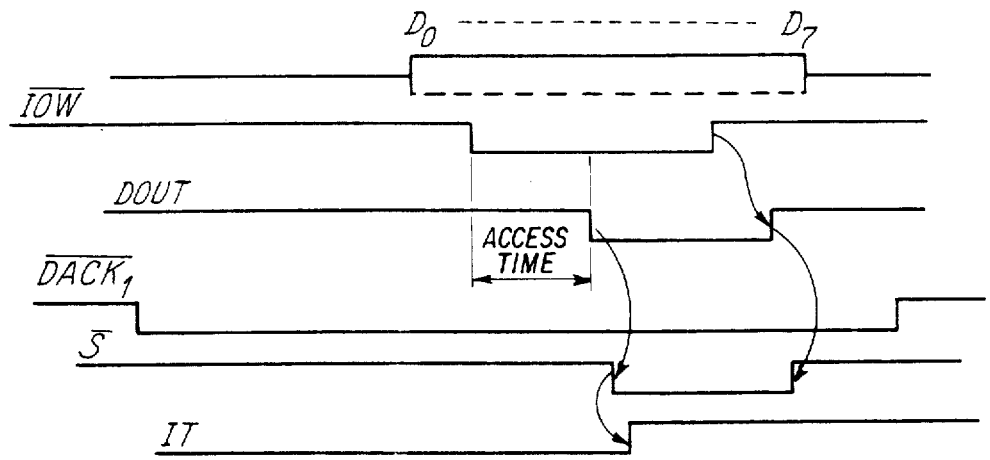

FIG. 7 shows a chronogram representing the main input and output signals of the system according to the invention, in the case of a data transfer between local memory of the microprocessor of the assembly and a peripheral equipment.

DETAILED DESCRIPTION OF THE INVENTION

Figure 1:
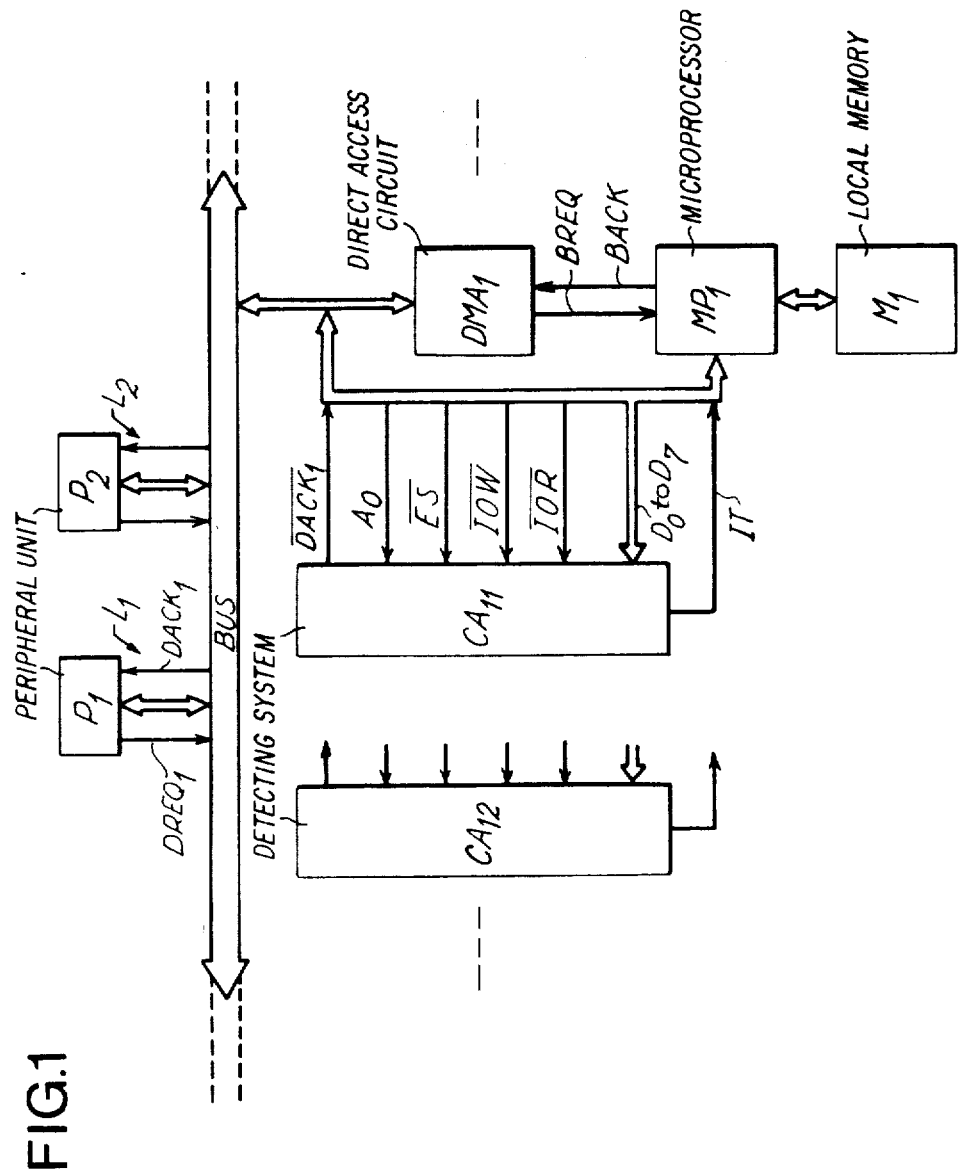
FIG. 1 diagrammatically shows a processor assembly in which there is provided an access request circuit to the memory of a microprocessor, as well as a detection system according to the invention for each of the channels of this access request circuit.

FIG. 1 diagrammatically shows a microprocessor assembly in which a microprocessor $MP_1$, as well as its associated local memory $M_1$ communicates with peripheral resources $P_1$, $P_2$, ... via a common bus and via a direct access request circuit $DMA_1$ to the memory. These access requests take place when exchanges or transfers of data have to be carried out in the processor assembly.

In the assembly shown in exemplified manner in FIG. 1, it is assumed that a single direct access circuit $DMA_1$ corresponds to the microprocessor $MP_1$. Other systems according to that of the invention are shown at $CA_{11}$, $CA_{12}$. As will be shown in greater detail hereinafter, each direct access request circuit to the memory is of type 8237, marketed e.g. by the INTEL Company. This circuit has several connection channels $L_1$, $L_2$, ..., which are respectively connected to peripheral units such as $P_1$, $P_2$, etc. across the bus BUS. These channels are not shown in detail in FIG. 1, but it is obvious that if e.g. four peripheral units are connected to microprocessor $MP_1$ by means of the bus and the direct access circuit $DMA_1$, there are four connection channels such as $L_1$, which connect these four peripheral units to the direct access request circuit.

The different signals referred to in FIG. 1 will be described in greater detail hereinafter and they have the following significance:

$DREQ_1$ is a signal indicating that unit $P_1$ makes an access request to the bus, e.g. for transferring data to microprocessor MP1 or to local memory $M_1$, said request passing via the bus to the direct access request circuit $DMA_1$.

Signal $\overline{DACK}_1$ is a signal supplied by circuit $DMA_1$, applied to peripheral unit $P_1$, via the bus, for indicating to said unit that its access request has been accepted. This signal is also transmitted to a stop code detection system $CA_{11}$, for reasons which will be explained in greater detail hereinafter.

Signal BREQ transmitted by direct access request circuit $DMA_1$ to processor $MP_1$ indicates an access request to the bus transmitted thereto by said circuit.

Signal BACK supplied by microprocessor $MP_1$ to the direct access request circuit $DMA_1$, indicates that said access request to the bus has been accepted by microprocessor $MP_1$.

Signals $D_0$ to $D_7$ represent data transmitted by the microprocessor in the direction of one of the peripheral units, or transmitted by one of the latter towards the microprocessor. This data are also applied, for reasons to be explained hereinafter, to detection system $CA_{11}$, in the considered example.

Signals $\overline{IOR}$ and $\overline{IOW}$ are supplied by microprocessor $MP_1$ by circuit $DMA_1$ in the considered example. These signals represent writing or reading input/output operations of a peripheral unit and are applied to a random access memory incorporated in the detection system.

Signal $\overline{ES}$ results from an address decoding performed for programming, in the manner to be shown hereinafter, a reference code in the random access memory of the present system.

Signal IT is an interruption signal applied to microprocessor $MP_1$ and optionally to direct access request circuit $DMA_1$, when a stop code is detected in data $D_0$ to $D_7$ from the local memory $M_1$ associated with microprocessor $MP_1$ or unit $P_1$, during a transfer of the channel corresponding to the direct access request circuit.

Signal $A_0$ is an addressing signal of the random access memory of the system.

Figure 2:
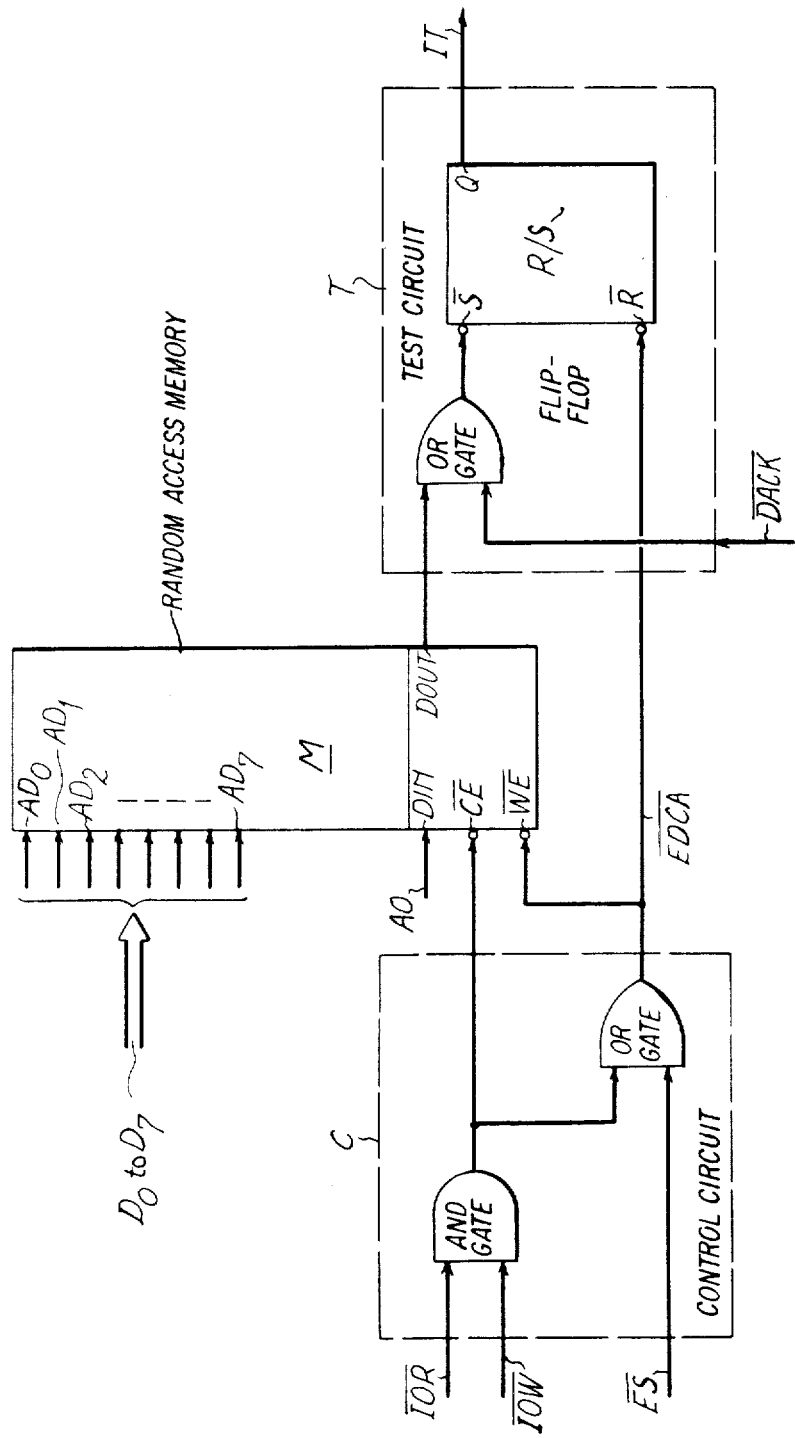
FIG. 2 diagrammatically shows the programmable stop code detection system according to the invention.

FIG. 2 diagrammatically shows a programmable stop code detection system according to the invention. This system is, for example, that shown at $CA_{11}$ in FIG. 1. It comprises a random access memory M of type MM5257J-3, marketed by e.g. National Semiconductors. For example, this memory has eight addressing inputs $AD_0$ to $AD_7$ which, for reasons which will be explained hereinafter, receive the data $D_0$ to $D_7$ from the system, whilst the other addressing inputs of said memory are not used. In per se known manner, said memory also comprises a data input DIN which, in the system according to the invention, receives an address bit A0. The system also comprises a control circuit C, whose outputs are respectively connected to the validation input $\overline{CE}$ and the writing control input $\overline{WE}$ of the memory. On its inputs, this circuit respectively receives signals $\overline{IOR}$, $\overline{IOW}$, $\overline{ES}$ from the microprocessor or from the direct access request circuit $DMA_1$ to the local memory $M_1$ as connected in FIG. 1. These signals respectively relate to an input/output operation, for reading or writing in a peripheral unit, as well as to the decoding of the addresses of the data. The system also comprises a test circuit T, connected to an output DOUT of the memory M. During a data exchange between a peripheral unit and the local memory $M_1$ of the microprocessor, this circuit makes it possible to detect the value of a bit possibly present in the data and the presence of a stop code loaded into memory M on initializing the system. The test is controlled by a control signal $\overline{DACK}$, which indicates the state of the channel corresponding to the peripheral unit, with which the stop code detection system is associated.

The control circuit C comprises an AND gate receiving from the microprocessor or direct access request circuit, signals $\overline{IOW}$ and $\overline{IOR}$ relating to the input/output operations for writing or reading peripheral unit. One output of the AND gate is connected to the validation control input CE of memory M. This control circuit also comprises an OR gate $OU_1$, which receives the address decoding signal $\overline{ES}$ on one input. Another input of gate $OU_1$ is connected to the output of the AND gate. Finally, the output of gate $OU_1$ is connected to the writing control input $\overline{WE}$ of memory M.

Test circuit T comprises an OR gate $OU_2$ receiving on one input the test control signal $\overline{DACK}$ from the direct access request circuit and indicating the state of the corresponding channel. On another input, gate $OU_2$ receives an output signal DOUT from the memory M. This signal when at logical level 0 indicates the presence of a stop code in the data. Finally, the test circuit T also comprises a R/S flip-flop, whereof one input $\overline{S}$ is connected to the output of gate $OU_2$ and whereof another input $\overline{R}$ is connected to the output of gate $OU_1$ of control circuit C. Output Q of the R/S flip-flop is connected, in the manner indicated hereinbefore, to a control input of the access request circuit and to a control input of the microprocessor. This output Q supplies a signal IT relating to the detection of a stop code eventually present in the exchanged data. This signal brings about the interruption of the processing operations carried out by the microprocessor and the stopping of the direct access circuit.

The system described hereinbefore works in the following way for the programming or recording of a reference stop code in memory M. In order to be written, memory M must receive active signals of logic level 0 on its inputs $\overline{CE}$ and $\overline{WE}$.

When it is wished to write a reference stop code at a predetermined address of memory M, it is assumed by convention that a bit 0 is entered at this predetermined address. This takes place in the following way. It is assumed that the microprocessor supplies the addresses $A_7, A_6, \ldots A_0$, a data XX among the data $D_0 \ldots D_7$ applied by the microprocessor to addressing input $AD_0$, $AD_7$ of memory M. If the addressing bit $A_0$ is equal to 0, for memory M, the application of these different signals corresponds to the writing of bit 0 at address XX. A stop code is then present at this address. Signal $\overline{ES}$ results from a decoding of addressing bits $A_1, \ldots A_7$, bit $A_0$ being not used in this decoding. This bit is applied to the memory data input DIN.

Conversely, if it is wished to indicate the absence of a reference stop code at a predetermined address of memory M, a bit of value 1 is entered at this predetermined address. As in the previous case, the microprocessor supplies from addressing bits $A_7, A_6 \ldots A_0$ one data YY from among the data $D_0, \ldots D_7$ applied to the addressing inputs $AD_0, \ldots AD_7$ of memory M. If bit $A_0$ is equal to 1, it means in the case that a stop code is absent at address YY of the memory M. As in the preceding case, the signal $\overline{ES}$ supplied to the input of gate $OU_1$ for controlling the writing into memory M, results from the decoding of signals $A_1, \ldots A_7$. Bit $A_0$ is not processed during this decoding and is applied to the memory data input DIN.

For detecting a stop code in the data $D_0 \ldots D_7$ present at inputs $AD_0$, $AD_7$ of memory M, during a data exchange between a local memory of a microprocessor and a peripheral equipment across the direct access request circuit to the memory, the system reacts in the following way. When one data XX from among the data $D_0 \ldots D_7$ is a stop code, the output signal DOUT from the memory is at logic level 0. If simultaneously the signal $\overline{DACK}$ supplied by the direct access request circuit is active (logic level 0) there appears at the output of the R/S flip-flop a signal IT of logic level 1 indicating the detection of a stop code. Memory M can e.g. be a random access memory having 256 registers of one bit.

FIGS. 3A and 3B show chronograms corresponding respectively to the essential signals received or transmitted by a microprocessor for exchanging data with a peripheral unit.

The chronogram of FIG. 3A represents the main signals occurring during a peripheral unit reading operation. The microprocessor transmits to the peripheral unit the address signals AD and then transmits a signal $\overline{IOR}$ for controlling the input-output operations and more particularly the reading of said peripheral unit. The data D can then be transferred to the microprocessor.

The chronogram of FIG. 3B diagrammatically represents the essential signals involved in an operation of writing data into a peripheral unit. The microprocessor firstly transmits the address signals AD in the direction of the peripheral unit in question. It then transmits a signal $\overline{IOW}$ for controlling the input-output operation and more particularly writing in the direction of said peripheral unit. Finally, the microprocessor transfers data D in the direction of this unit.

FIG. 4 is a chronogram diagrammatically representing the main signals exchanged between a microprocessor and the direct access request circuit, as well as the main signals exchanged between said circuit and a peripheral unit involved on one of the channels of said direct access request circuit to the memory.

When one of the peripheral units, such as e.g. peripheral unit $P_1$ (FIG. 1) wishes to exchange data with microprocessor $MP_1$ or with the local memory associated therewith, it firstly transmits a transfer request signal $DREQ_1$, which is supplied to the direct access request circuit $DMA_1$. The latter then supplies to microprocessor $MP_1$ a signal BREQ indicating that the access request circuit has received a transfer request and wishes to use the bus. Once the cycle taking place has ended, the microprocessor then transmits a signal BACK indicating to the access request circuit that the access request to the bus has been accepted. Then the circuit $DMA_1$, as a function of the different priorities of the data transfer request circuit received, transmits the signals $\overline{DACK}_1$ which is supplied to the peripheral unit $P_1$, said signal indicating to the peripheral unit that its transfer request has been accepted. It is the descent of signal $\overline{DACK}_1$ which makes it possible to initiate the transfer of data from peripheral equipment $P_1$ to the memory associated with microprocessor $MP_1$.

FIG. 5 is a chronogram diagrammatically representing the main signals reaching the inputs of the system according to the invention, for the recording or programming of a reference stop code in random access memory M. In this chronogram, the signal $\overline{ES}$ is a signal supplied by the microprocessor or the direct access request circuit and which is applied to the input of gate $OU_1$ of control circuit C. This signal results from the decoding of addresses $A_1, \ldots A_7$ supplied by the microprocessor or by the access request circuit, with the exception of address $A_0$. Following this decoding, the microprocessor supplies the signals $\overline{IOW}$ for controlling the input-output operation and specifically the writing operation. This signal is applied to the input of an AND gate of control circuit C. Therefore the output signal $\overline{\text{EDCA}}$ of gate $\overline{\text{OU}}_1$ of the control circuit becomes active and consequently passes to level 0. This signal is applied to the writing input $\overline{\text{WE}}$ of memory M. Then, if the data signals $D_0$ to $D_7$ are applied to the addressing inputs $AD_0, \ldots AD_7$ of the memory, and if the binary addressing signal $A_0$ is applied to the data input DIN of memory M, said binary signal is recorded at the desired address in memory M. When the logic level of signal $A_0$ is 0 ($A_0 = 0$), this means that a stop code has been recorded at the predetermined address by data signals $D_0$ to $D_7$. Conversely, if the logic level of signal $A_0$ is high ($A_0 = 1$) this means that there is no stop code at the corresponding address. After the writing of the stop code in memory M, signals $\overline{\text{IOW}}$, $\overline{\text{EDCA}}$ and $\overline{\text{ES}}$ again become inactive and consequently pass to logic level 1.

FIG. 6 is a chronogram of the main input and output signals of the system according to the invention, in the case of the detection of a stop code, during a data transfer between a peripheral unit such as $P_1$ (FIG. 1) and the local memory $M_1$ of microprocessor $MP_1$ across a channel of the direct access request circuit. The data to be transferred are represented at $D_0, \ldots D_7$ on this chronogram. To carry out the transfer, the microprocessor firstly transmits a reading input-output operation control signals $\overline{\text{IOR}}$, which on the one hand controls the reading of peripheral unit $P_1$ and on the other hand it is applied to one of the inputs of the AND gate of the control circuit C of the detection system according to the invention, thereby validating the random access memory M. With a certain time lag, which is dependent on the access time on the random access memory M, and if a stop code is present at the address determined by data $D_0$ to $D_7$ received in the memory M, the output signal DOUT from memory M passes to a low logic level 0. When the transfer taking place relates to channel L1 of the direct access direct request circuit $DMA_1$ of memory $M_1$, the latter supplies the data transfer of acceptance signal $\overline{\text{DACK}}_1$ which is applied to gate $OU_2$ of test circuit T, the output signal of gate $OU_2$ applied to input $\overline{S}$ of R-S flip-flop becomes active (passes to low logic level 0) and then signal $\overline{\text{EDCA}}$ applied to input R of the flip-flop is at logic level 1, so that output signal IT of the flip-flop passes to logic level 1. This signal is applied to microprocessor $MP_1$ and optionally to the direct access request circuit $DMA_1$ in order, to bring about an interruption of the microprocessor, or a stopping of the data transfer via circuit $DMA_1$ to memory $M_1$. Any new programming of a stop code in memory M requires the activation of output signal $\overline{\text{EDCA}}$ of gate $OU_1$. This signal, which is then at the low logic level, brings about the resetting (low logic level) of the output signal IT of the R-S flip-flop.

FIG. 7 is a chronogram of the main input and output signals of the system according to the invention, in the case of a data transfer between the local memory $M_1$ of the microprocessor $MP_1$ and the peripheral unit $P_1$ across an access request circuit channel. Data $D_0$ to $D_7$ transferred from the memory to peripheral unit $P_1$ are applied to the address inputs $AD_0$ to $AD_7$ of memory M of the detection system. The access request circuit $DMA_1$ also supplies a writing input-output operation control signal $\overline{\text{IOW}}$ to the memory M of the detection system. Following a certain access time and if a stop code is present at the address determined by data $D_0$ to $D_7$ received in random access memory M, the output signal DOUT from memory M becomes active (passes to a low logic level 0). If the transfer taking place relates to channel $L_1$ of direct access request circuit $DMA_1$ to memory M, the latter then supplies signal $\overline{\text{DACK}}_1$ (low logic level). Signals DOUT and $\overline{\text{DACK}}_1$ are applied to the inputs of gate $OU_2$ of test circuit T. If they are both at low logic level 0, a low logic level signal is applied to input S of the R-S flip-flop. Then the signal IT on output Q of the flip-flop passes to logic level 1, thus indicating that a stop code is present in the transfer data. This stop code corresponds to a reference code recorded in memory M. The high logic level signal IT (level 1) is applied, as in the preceding example, to the microprocessor and optionally to the direct access request circuit in order to bring about either an interruption of the processing carried out by the microprocessor, or a data transfer stoppage.

As in the other operating examples described signal $\overline{\text{WE}}$ is inactive (logic level 1). The states of signals $\overline{\text{ES}}$ and $A_0$ respectively applied to input DIN of memory M and the input of gate $OU_1$ of control circuit C are of no importance in this case, the random access memory M only being read.

In the present embodiment of the system according to the invention, memory M is constituted by 256 bit registers or one bit and permits the programming of 256 reference stop codes.

What is claimed is:

1. A system for the detection of programmable stop codes in a data exchange performed between a local memory of each microprocessor of a microprocessor assembly and at least a peripheral unit, each microprocessor being connected to a direct access circuit to the local memory, said circuit also dividing the access to a common bus permitting data exchanges between the peripheral unit and the local memory, the system comprising a random access memory having addressing inputs receiving data and a data input receiving an address bit, a control circuit having outputs which are respectively connected to validation and writing control inputs of the random access memory, whereby said control circuit respectively receives on inputs signals coming from the microprocessor or the direct access circuit and which respectively relate to writing or reading input-output operations of the peripheral unit, as well as to address decoding of the data, and a test circuit connected to a reading output of the random access memory for testing during a data exchange a binary value recorded at a current address of the random access memory and determined by the data, said testing being controlled by a test control signal applied to the test circuit by the direct access circuit to the local memory of the microprocessor, the binary value being representative of the presence or the absence of a stop code in the data.

2. A system according to claim 1, wherein the control circuit comprises an AND gate, receiving from the microprocessor or from the direct access circuit, signals having a logical level relating to input-output operations and controlling the writing or reading of the peripheral unit, one output of the AND gate being connected to a validation control input of the random access memory, and an OR gate receiving on one input the data address decoding signal from the memory while another input of the OR gate is connected to an output of the AND gate an output of the OR gate being connected to the writing control input of the random access memory.

3. A system according to claim 2, wherein the test circuit comprises an OR gate receiving the test control signal from the direct access circuit on one input while another input receives from the random access memory the binary value indicating that a stop code is present in the transferred data, and a R-S flip-flop, whereof one input is connected to an output of the OR gate of the test circuit and whereof a resetting input of the flip-flop is connected to the output of the OR gate of the control circuit, the output of said flip-flop being connected to a control input of the direct access circuit and to a control input of the microprocessor for supplying thereto a signal relating to the detection of an eventual stop code causing the interruption of the exchange and the interruption of the corresponding microprocessor.

* * * * *